United States Patent Office 3,381,632
Patented May 7, 1968

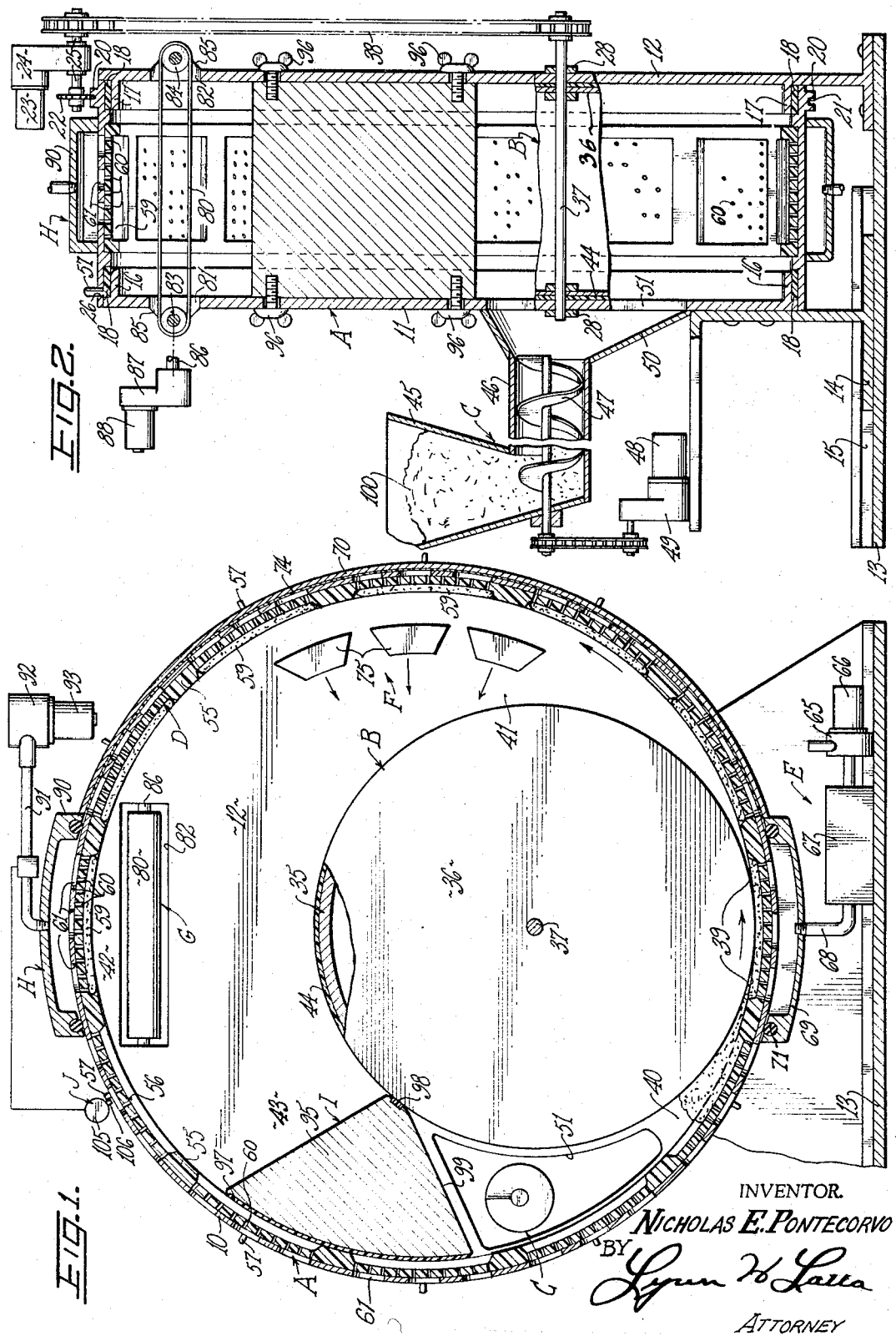

3,381,632
METHOD AND APPARATUS OF MOLDING PIZZA PIE CRUSTS, CHEESE SLICES AND THE LIKE
Nicholas E. Pontecorvo, 18234 Valley Vista, Tarzana, Calif. 91356
Filed Oct. 22, 1965, Ser. No. 502,069
13 Claims. (Cl. 107—8)

ABSTRACT OF THE DISCLOSURE

Disclosed herein is a method and apparatus for automatically molding pizza pie crusts and the like, wherein bulk dough is fed from a hopper into a chamber defined between converging cylindrical male and female surfaces of rollers or drums rotating substantially in unison at a narrow pass where the surfaces are nearly tangent, the dough, in moving through said pass, being squeezed into shallow mold cavities in the female mold drum, assisted by suction which is applied to each cavity as it moves through the pass; the patties then being carried upwardly to an overhead position by the rotating female drum, where they are discharged onto a suitable receiving surface such as a conveyor, air pressure being applied to the cavities at said overhead position and co-operating with gravity in effecting release of the patties from the mold cavities.

---

This invention relates to the molding of articles of plasticized food material in thin patty form suitable for use as pizza pie crusts, dessert pie crusts, biscuits, cookies, cheese slices, processed meat slices, and other food products originating in a soft plastic condition, and which under present methods require the expenditure of considerable time and effort by skilled laborers or artizans. The general object of the invention is to simplify, expedite and reduce the cost of forming such food products by the provision of a method and a substantially automatic apparatus:

(1) Wherein the plasticized food material is fed into a receiving chamber between male and female rolls which function to roll the plastic material into thin wafer form;

(2) Wherein any selected peripheral shape, whether circular, oval, square, polygon or otherwise, is directly molded into the plastic food material as it is rolled into thin sheet form;

(3) Wherein the patty form is provided for by shallow mold cavities in the internal periphery of the female roller;

(4) Wherein the diameter of the female roller is much greater than that of the male roller so that maximum area is provided for a substantial number of mold cavities;

(5) Wherein the molding is done in a lower area of the apparatus and the molded patties are carried upwardly by the rotating female roller to a discharge area where the mold cavities are inverted or at least partially inverted so as to utilize gravity to assist the discharge of the molded patties from the mold cavities;

(6) Wherein the molded patties are held securely in the mold cavities by suction prior to reaching the discharge area;

(7) Wherein the patties are discharged directly upon a discharge conveyor operating beneath the upper area of the female roller;

(8) Wherein positive air pressure is applied to the mold cavities in the discharge area so as to assist gravity in the discharging of the patties and to insure against any possibility of a patty remaining adhering or partially adhering to the mold cavity;

(9) Wherein provision is made for reducing the moisture content so as to firm or to harden or to dry the patties during movement thereof from the forming area to the discharge area.

These and other objects will become apparent in the ensuing specification and appended drawing in which:

FIG. 1 is a transverse sectional view of an apparatus embodying the invention, with system parts showing schematically; and FIG. 2 is a vertical sectional view taken partially through the inlet side of the apparatus and partially through the axis of the male roller.

Referring now to the drawings in detail and in particular to FIG. 1, I have shown therein, as an example of one form of apparatus for practicing the invention, a pizza dough molding apparatus comprising, in general, a cylindrical housing A which functions as a female roller carrying die cavities therein; a male roller B disposed within the housing A having a rotating cylindrical liner drum D in eccentric relation thereto; means C including an inlet to the housing A for feeding dough into the apparatus; the liner D of release material replaceably mounted in the housing A and providing a selected series of die cavities from which the dough patties will be readily released without adhesion; a vacuum system, indicated generally at E, for applying suction to the mold cavities of housing A in the molding and transit areas thereof; heating means F located in that portion of the processing chamber which is defined between the housing A and male roller B, wherein transit of the molded patties from the molding area to the discharge area takes place; a discharge conveyor G located in the top of the processing chamber so that the patties deposited thereon are disposed in a substantially horizontal plane; a compressed air system H including means for applying positive air pressure to a die cavity disposed above the discharge conveyor G, so as to positively expel the dough patty from that cavity onto the discharge conveyor G; a barrier I disposed above the inlet of the feeding means C for causing the dough to be placed under compression in the inlet portion of the processing chamber; and control means J for applying the pressure from system H intermittently so as to effect discharge of the dough patty when it is centered over the conveyor G.

Housing A includes a cylindrical rotatable shell 10 of sheet metal or equivalent form-sustaining material and into which the liner D can be snugly fitted so that the desired cylindrical configuration of liner D will be sustained by the shell 10. The housing A is closed at its ends by stationary front and back plates 11 and 12 fixedly supported by a suitable base 13 and thereby supporting the main structure of the apparatus. Back plate 12 is permanently mounted to the base 13 and front 11 is detachably mounted by suitable means such as the slide parts indicated at 14, 15 so as to make it possible to open up the housing for cleaning, for repair and other servicing, and for replacement of the mold cavity liner D. End plates 11 and 12 are provided with suitable bearing flanges 16 and 17 projecting into the shell 10 and having bearing collars 18 (e.g. of low friction material such as Teflon) providing bearing surfaces upon which the respective ends of shell 10 are rotatably mounted. On the periphery of shell 10 at the back end thereof is an annular drive member 20 which can be an integral collar or flange provided with ring gear teeth or cavities 21 meshing with a drive pinion or cog wheel 22 which is driven by suitable drive mechanism such as a motor 23 and a reduction gear 24 driven by the motor 23 and in turn transmitting slow drive through a drive shaft 25 to the driving pinion 22.

At its forward end housing shell 10 is provided with a series of circumferentially spaced apertures 26 through which a series of control fingers of the control apparatus J are projected for operation as hereinafter described.

In the respective end plates 11, 12, eccentrically disposed with relation to the axis of rotation of the housing shell 10, are respective bearings 28 for rotatably supporting the male roller B.

Male roller B is a plain roller with a cylindrical periphery 35 and integral end members 36 having respective hubs mounted on a through shaft 37 (or respective separate trunnions) mounted in the respective bearings 28. The shaft 37 is driven by a suitable drive which is synchronized with the drive to housing shell 10 in a suitable manner, such as by a chain drive 38 taken from the main drive shaft 25. The synchronization of the rotations of the male roller B and of the housing shell 10 is such that the peripheral speed of the roller B is the same as that of the cylindrical internal wall of housing liner D at the point of tangency of these opposed surfaces. Rotation is anti-clockwise as viewed in FIG. 1 and as indicated by the arrows. A restricted pass 39 is defined between the rollers A and B in the area of the point of tangency.

Defined between the male roller B and the mold cavity liner D is a processing chamber including an entry portion 40, the restricted pass 39, a transit area 41 in which the formed patties are carried upwardly for discharge, the discharge area which is indicated at 42 and which consists of the top of the chamber above the discharge conveyor G, and a terminal area 43 extending toward entry portion 40. Preferably the periphery and ends of roller B are faced with a coating 44 of release material such as Teflon or nylon to inhibit any tendency of the roller surface to adhere to the food wafers being molded in the apparatus, and for anti-friction sealing.

Feed mechanism C comprises a hopper 45 communicating with the outer end of a tubular conduit 46 of a screw conveyor including a screw 47 suitably driven as by means of a motor 48 and a reduction gear 49. These parts can be supported on the same slide 14 and ways 15 which support the end wall 11 for retraction away from the remainder of the apparatus to open it up for servicing, etc. The other end of conveyor conduit 46 is connected by a flaring delivery hood 50 to a circumferentially elongated inlet port 51 of semi-crescent shape conforming approximately to the narrowing configuration of the entry chamber 40.

Liner D is in the form of cylinder 55 of release material such as Teflon or nylon having a plain cylindrical periphery adapted to snugly fit the internal wall of housing shell 10 and formed with a plurality of internal circumferentially-spaced shallow mold cavities 56 having a radial depth which determines the thickness of the patty that is molded. The cavities 56 have a peripheral contour of any selected shape for the required use, whether circular, square or other shape. The invention contemplates the provision of a series of replaceable liners B having cavities of varying shapes and dimensions determined by the particular patty to be molded.

At one end the liner D is provided with a series of radially outwardly projecting integral fingers 57 adapted to extend through the peripheral apertures 26 of the housing shell 10 and to function for triggering the application of air pressure through the compressed air system H, as hereinafter more fully described. The material of liner D is sufficiently flexible and yieldable so that in installing or removing one of the liners, the end which carries the fingers 57 can be contracted inwardly to permit the fingers to clear the inner wall of shell 10 until they register with the apertures 26 and then to spring outwardly into the apertures; and vice versa.

In the molding operation, dough which is fed into the entry chamber 40 through the feed apparatus C is drawn into the restricted pass 39 by the action of the opposed, approaching surfaces of the roller B and liner D which operate to compress the dough as they approach one another and thus to attain a grip against it, this operation being facilitated by the outward extrusion of the dough into the die cavities 56 by the compression of the dough. Thus the body of dough, in effect, becomes geared to the liner D and is positively fed into the restricted pass 39 where the periphery of roller B levels off the surface of the dough in the mold cavity so as to form it into a continuation of the cylindrical internal surface of the liner body. Thus a series of separated dough patties 59 are formed as the successive mold cavities 56 move through the restricted pass 39.

The thin wall portions of the liner D which define the bottoms of mold cavities 56 are provided with a multiplicity of small apertures 60 (e.g. approximately .020 inch diameter) too small to permit the dough to be extruded into the apertures to any objectionable extent, and sufficiently numerous so that suction and air pressure can be successively applied to the bottoms of the cavities so as to (1) prevent the formation of any air bubbles between the molded wafer and the bottom of the bowled cavity; (2) retain the dough patties securely attached to the mold cavities while they are conveyed upwardly and gradually inverted; and (3) forcibly discharge the dough patties from the mold cavities as they arrive at the discharge area 42. It is contemplated that a spacing of one half inch apart in all directions will be sufficiently close for any plasticized food material that may be molded in the apparatus (e.g. pizza dough) and that where cheese patties are formed in the apparatus, the apertures need not be closer than one inch apart. It will be understood of course that the spacing (and the diameter) of the apertures may be varied depending upon such characteristics as elasticity, viscosity, etc. in the food product being molded. The housing shell 10 is provided with one or more ports 61 providing communication with the multiplicity of apertures 60 and the respective suction and pressure shoes hereinafter described.

Vacuum system E comprises a suitable suction pump or fan 65 driven by a motor 66 and withdrawing air from a vacuum chamber 67 which is in communication through a suction conduit 68, with a suction shoe 69 from which air is evacuated into the vacuum chamber 67. The shoe 69 preferably has its rim lined with a gasket 71 of low friction material such as Teflon or nylon, which can bear directly against a smooth external peripheral surface provided on housing shell 10. The invention as shown may utilize a single vacuum shoe 69 below the pass 39, and a sealing shoe 70 of segmental cylindrical arcuate form with a Teflon-lined inner surface, bearing against the smooth periphery of shell 10, and extending approximately halfway around the shell, for sealing the apertures 60 against the entry of air during travel from the suction shoe 69 to the discharge area 42.

Heating means F may comprise a plurality of heat lamps (e.g. infrared) 75 adapted to apply radiant heat to the patties 59 on one side and to the surface of roller B on the other side. Where cheese is being molded, the heating of the surface of roller B has the beneficial effect of maintaining the cheese patties in a satisfactorily plastic condition until they are discharged. Where pizza dough crusts are being molded, a heating effect may be such as to cause the roller B to dry the surfaces of the patties 59 so as to form a slight crust thereon and thereby inhibit the tendency for the patties to adhere to the discharge conveyor G.

Conveyor G comprises a belt 80 faced with a coating of release material such as Teflon, traveling through windows 81 and 82 in the end plates 11 and 12 respectively and around rollers 83 and 84 journalled in suitable supports 85 which can be integral with the end plates; and driven through a suitable drive shaft 86 from a reduction gear 87 and a motor 88 driving the same. At this point it may be noted that the drive mechanisms for the various components are illustrated schematically in the drawings, since well-known drive elements can be employed.

The height of the windows 82 above the belt 80 is preferably such as to provide space for pans which can be fed in sequence into the apparatus upon the conveyor G so as to receive the successive patties 59 as they are discharged from the mold cavities.

Air pressure discharge mechanism H comprises a shoe 90 which can be of construction similar to the shoe 69, sealed in a similar manner to the surface of housing shell 10 and supplied with pressurized air through a conduit 91, delivered by a pump 92 driven by a suitable motor 93. The invention provides for delivering pulses of compressed air intermittently so as to apply pressure through the apertures 60 to a mold cavity as it becomes centered over the conveyor G. This is provided for by the control apparatus which will presently be described.

Barrier I comprise a body 95 of wedge section traversing the terminal area 43 of the processing chamber, and having squared ends secured by suitable fasteners 96 to the respective end walls 11, 12. The fasteners attaching it to the removable wall 11 can be wing-nuts or other suitable releasable fasteners to permit the end wall and feed unit C to be backed away from the remainder of the apparatus for servicing etc., the barrier body 95 being thus left supported on the end wall 12.

Barrier body 95 has a low friction coating 97 on its arcuate outer face, and a seal strip 98 of corresponding material extending lengthwise along its apex and bearing against the periphery of roller B so as to form an effective seal across the terminal area 43 of the processing chamber, separating it from the entry chamber 40. The under side 99 of the barrier thus provides a sealed upper wall for the entry chamber 40 so that a pressure area is developed in the entry chamber 40 by the action of the dough being forced into the chamber by feed apparatus C, and consequently the dough is fed into the forming pass 39 under pressure.

Control apparatus J comprises the trigger fingers 57 projecting from liner D through the housing apertures 26; together with a suitable control device such as a valve 105 carried by the end plate 11 and having an actuator lever 106 positioned to be engaged by one of the trigger fingers 57 as the housing shell 10 rotates. It will now be apparent that the trigger fingers 57 are spaced apart a distance corresponding to the angular spacing of the mold cavities 56, and are positionally related to the location of valve lever 106 so as to trip the latter as the mold cavities are respectively centered beneath the pressure shoe 90.

Having described the apparatus, it will now be apparent that by maintaining a body of dough 100 in the hopper and feeding it into the entry chamber 40 through the screw conveyor 46, 47, that the dough will be delivered into this chamber as fast as it is permitted to enter by the rate of transfer of dough through the pass 39 by the mold cavities 59, the dough in the entry chamber 40 remaining constantly pressurized by the action of the screw conveyor and the drawing action of the approaching roller surfaces of chamber 40. Thus it will be forced into each mold cavity in turn and as the cavity arrives at the pass 39, suction will be applied to the bottom of the cavity to withdraw any entrained air bubbles from beneath the patty, and the pressurized dough will then complete the filling of the cavity at this position.

As the dough patty is carried upwardly in the transit chamber 41, it will pass the heaters 75 where moisture will be withdrawn therefrom in accordance with the temperature control of the heaters 75, which can be regulated by suitable means such as an adjustable thermostat responsive to the temperature in the chamber 41 (not disclosed since any conventional adjustable thermostat can be utilized).

Since all air has been withdrawn from between the patties 59 and the mold cavities 56, the sealing of the ports 61 by the sealing shoe 70, from the suction shoe 69 around to the pressure shoe 90, will prevent the reentry of air into the mold cavities sufficiently to maintain the adherence of the patties to the bottoms of the cavities. Thus the cavities will be carried upwardly into inverted positions as they approach the discharge area 42 and finally will be positioned in a centered position beneath the pressure shoe 90. As the patty arrives in a centered position above discharge conveyor G the valve 105 will be opened by triggering action of one of the fingers 57, an air pressure pulse will thereby be delivered to the pressure shoe 90, and will be applied by the shoe 90 through the ports 61 and apertures 60 to the bottom of the mold cavity at the discharge position, forcing the patty from this mold cavity and causing it to drop by gravity upon the conveyor belt 80. The belt 80, operated by its drive 86–88, will convey the patty to the discharge window, onto a suitable carryaway conveyor or into a receptacle as may be determined by the particular operation being preformed.

The term "dough" as used herein is tended to have a broad meaning embracing any soft plastic food material such as bread, pie and cake doughs, and also plasticized cheese, soft candy and other food products of comparable consistency, and is not to be restricted to flour or doughs.

I claim:

1. A method of molding a patty of plastic food material comprising the following steps: feeding said material in bulk into a chamber defined by respective rotating male and female cylindrical surfaces moving in a common circumferential direction in converging relation toward a restricted pass; guiding a portion of said material into said pass, forcing it into a shallow mold cavity within the area of said pass; applying suction to said portion of material to draw it into the mold cavity; and utilizing said surfaces within said pass area to thin said portion of material into patty form with a peripheral configuration determined by the mold cavity; conveying the mold cavity beyond said pass; and applying air under pressure to the patty for positively discharging the patty from the cavity at a distance from the pass.

2. The method defined in claim 1, wherein the mold cavity is carried in a circular path by one of said rotating surfaces, wherein said pass is at the bottom of said circular path, and wherein the point of discharge from the cavity is near the top of said path and the mold cavity is there inverted, and wherein gravity is utilized to assist the discharge of the patty from the inverted mold cavity.

3. The method defined in claim 2, including the step of applying heat to the patty during its transit from said pass to the discharge point.

4. Apparatus for molding patties of plastic food material, comprising: rotatable male and female rollers having radially opposed peripheral and internal forming surfaces respectively, the male roller being disposed within the female roller with its axis parallel and eccentric to the axis of the female roller and having a plain cylindrical periphery substantially tangent to said internal forming surface and defining therewith a restricted pass at the point of tangency; means for rotating said rollers so as to cause said opposed peripheral and internal surfaces to move with common circumferential direction and speed at said pass and to approach said pass in converging relation of portions of said surfaces between which an entry chamber is defined; a plurality of shallow mold cavities carried by the internal surface of said female roller; means for feeding said plastic food material into said entry chamber for conveyance by said approaching converging surfaces into said pass so as to cause a patty to be molded into said cavities while travelling through said pass; said female roller comprising a cylindrical housing shell and means providing a surface of release material lining said shell and said mold cavities and defining an internal peripheral surface from which said patties are removed internally of said female roller.

5. Apparatus as defined in claim 4, wherein said last means comprises a cylindrical liner of release material supported in said housing shell and having said mold cavities formed therein.

6. Apparatus as defined in claim 5, wherein said liner is removably supported in said shell, for replacement by another liner having differing mold cavities therein.

7. Apparatus for molding patties of plastic food material, comprising: a housing having a cylindrical internal wall provided with a plurality of circumferentially-spaced mold cavities; respective end members closing the ends of said housing and having means on which said housing is mounted for rotation; a male roller rotatably mounted eccentrically within said housing with one side thereof substantially tangent to the internal wall of said housing so as to define a restricted pass, a crescent-shaped processing chamber being defined between radially-opposed peripheral and internal surfaces of said roller and housing, said processing chamber including an entry chamber defined between portions of said opposed surfaces approaching said pass in converging relation; means for rotating said roller and housing in a common direction and at equal circumferential speed at the point of substantial tangency; means for feeding said plastic food material into said entry chamber for conveyance by said approaching converging surfaces into said pass so as to cause the patties to be molded in said cavities while travelling through said pass; said housing and roller being disposed with their axes horizontal and with said pass at the bottom of said processing chamber; means in the top of said processing chamber for receiving patties discharged from mold cavities which are inverted at the top of the path of movement of said housing; and heating means disposed in a portion of said processing chamber defined between opposed areas of said surfaces moving upwardly from said pass to area of discharge of said patties.

8. Apparatus as defined in claim 7, wherein said housing and roller are disposed with their axes horizontal and said pass is disposed at the bottom of said processing chamber; and including a discharge conveyor travelling through the top of said processing chamber and through openings in said end members and positioned to receive patties discharged from the cavities as they reach inverted positions at the Zenith of their path of travel.

9. Apparatus for molding patties of plastic food material, comprising: a housing having a cylindrical internal wall provided with a plurality of circumferentially-spaced mold cavities; respective end members closing the ends of said housing and having means on which said housing is mounted for rotation; a male roller rotatably mounted eccentrically within said housing with one side thereof substantially tangent to the internal wall of said housing so as to define a restricted pass, a crescent-shaped processing chamber being defined between radially-opposed peripheral and internal surfaces of said roller and housing, said processing chamber including an entry chamber defined between portions of said opposed surfaces approaching said pass in converging relation; means for rotating said roller and housing in a common direction and at equal circumferential speed at the point of substantial tangency; and means for applying compressed air to each mold cavity as it reaches the discharge area.

10. Apparatus as defined in claim 9, wherein said means for applying compressed air comprises a plurality of apertures in the portions of said housing defining the bottoms of the mold cavities, a pressure chamber shoe sealed to periphery of said housing and communicating in sequence with the apertures of the respective cavity bottoms, and means for applying intermittent pulses of compressed air to said shoe when the cavities are centered at the discharge area.

11. Apparatus for molding patties of plastic food material, comprising: a cylindrical housing, a circumferential array of internal mold cavities therein; respective end members closing the ends of said housing and having means on which said housing is mounted for rotation; a male roller rotatably mounted eccentrically within said housing with one side thereof substantially tangent to the internal wall of said housing so as to define a restricted pass, a crescent-shaped processing chamber being defined between radially-opposed peripheral and internal surfaces of said roller and housing, said processing chamber including an entry chamber defined between portions of said opposed surfaces approaching said pass in converging relation; means for rotating said roller and housing in a common direction and at equal circumferential speed at the point of substantial tangency; and means for feeding said plastic food material into said entry chamber for conveyance by said approaching converging surfaces into said pass so as to cause the patties to be molded into patties in said cavities while travelling through said pass; and means for applying suction to the mold cavities when located at said pass, whereby to withdraw any air entrained between the patties and the bottoms of the mold cavities.

12. Apparatus as defined in claim 11, wherein said mold cavity bottoms are provided with air-passages, and wherein said suction-applying means comprises a vacuum shoe substantially sealed to the periphery of said housing and communicating with said pass through said air passages, and means for applying suction to said shoe.

13. Apparatus as defined in claim 12, wherein said shoe is centered at said pass, and including a sealing shoe covering that portion of the periphery of the housing moving from said pass to the discharge area and closing said apertures so as to inhibit the entry of air into the mold cavities during transit thereof from said pass to the discharge area.

References Cited

UNITED STATES PATENTS

| 1,931,759 | 10/1933 | Hasing | 264—310 X |
| 2,001,243 | 5/1935 | Elliott | 107—8 |
| 3,215,093 | 11/1965 | McKown et al. | 107—1 |

FOREIGN PATENTS

| 252,479 | 6/1926 | Great Britain. |

WALTER A. SCHEEL, *Primary Examiner.*

J. SHEA, *Assistant Examiner.*